United States Patent [19]

Walker

[11] Patent Number: 4,661,074

[45] Date of Patent: Apr. 28, 1987

[54] APPARATUS FOR AND METHOD OF TEACHING READING AND SPELLING

[76] Inventor: Susan M. Walker, 2013 Ashley Dr., Phenix City, Ala. 36867

[21] Appl. No.: 773,607

[22] Filed: Sep. 9, 1985

[51] Int. Cl.[4] .............................................. G09B 17/00
[52] U.S. Cl. .................................... 434/178; 434/184
[58] Field of Search ............... 434/178, 172, 167, 156, 434/159, 184

[56] References Cited

U.S. PATENT DOCUMENTS 3,214,848  11/1965  Van Eycke ..................... 434/167 X
3,654,712   4/1972  Bagdasar ........................ 434/172 X
4,204,343   5/1980  Brooks .............................. 434/172

Primary Examiner—William H. Grieb
Attorney, Agent, or Firm—Michael C. Smith

[57] ABSTRACT

A reading and spelling teaching system primarily for auditory dyslexics and visual dyslexics having a phonogram classification board with the seven categories of vowel sounds depicted, phonogram cards with the major vowel sounds of each vowel group (a, e, i, o, u), consonant cards depicting through pictures the consonant sounds and consonant blends/consonant diagraph sounds, and a teaching device in the form of a game for reinforcement of the phonograms.

4 Claims, 9 Drawing Figures

DICTATION-REHEARSAL LIST

R-CONTROLLED

| ar | arm | ark | art | arp |
|---|---|---|---|---|
| bar | farm | bark | cart | carp |
| car | harm | dark | dart | harp |
| far | marm | hark | part | sharp |
| jar | | lark | tart | |
| mar | | mark | smart | |
| par | | park | start | |
| tar | | clark | chart | |
| scar | | shark | | |
| spar | | spark | | |
| star | | stark | | |

LAST e RULE

| ace | ade | age | ake | ale | ame | ane |
|---|---|---|---|---|---|---|
| face | fade | cage | bake | bale | came | bane |
| lace | made | gage | cake | dale | dame | cane |
| pace | wade | page | fake | gale | fame | Dane |
| race | blade | rage | Jake | male | game | Jane |
| brace | glade | sage | lake | pale | lame | Lane |
| grace | grade | wage | make | sale | name | mane |
| place | trade | stage | rake | tale | same | pane |
| trace | shade | | sake | shale | tame | sane |
| space | spade | | take | whale | blame | wane |
| | | | wake | | flame | plane |
| | | | flake | | shame | |
| | | | brake | | | |
| | | | shake | | | |
| | | | snake | | | |
| | | | stake | | | |

| ape | ate | ave | aze |
|---|---|---|---|
| cape | date | cave | daze |
| nape | fate | Dave | faze |
| rape | gate | pave | gaze |
| tape | hate | rave | haze |
| drape | late | save | maze |
| grape | rate | wave | raze |
| scrape | plate | slave | blaze |
| shape | slate | brave | glaze |
| | crate | crave | |
| | grate | grave | |
| | state | shave | |
| | skate | stave | |

FIG. 2

NONSENSE WORDS a VOWELS

| Pattern S | Pattern S + R-Controlled | Pattern S, R-Cont. + Long e |
|---|---|---|
| 1. smap | 1. sparp | 1. slame |
| 2. tran | 2. snark | 2. grap |
| 3. brap | 3. flam | 3. snarm |
| 4. sab | 4. brast | 4. trable |
| 5. blass | 5. cran | 5. grale |
| 6. fatch | 6. slark | 6. brak |
| 7. tash | 7. trass | 7. slad |
| 8. fam | 8. crast | 8. skarm |
| 9. sland | 9. flan | 9. blag |
| 10. slamp | 10. trast | 10. crake |
| 11. spag | 11. skark | 11. blarp |
| 12. trad | 12. trarp | 12. snarb |
| 13. tast | 13. blatch | 13. chard |
| 14. kack | 14. trag | 14. splark |
| 15. stash | 15. sparge | 15. scrad |
| 16. natch | 16. trad | 16. blave |
| 17. bram | 17. shar | 17. splame |
| 18. spast | 18. snarge | 18. trage |
| 19. grash | 19. clarp | 19. sclart |
| 20. slanp | 20. trand | 20. brast |

| Pattern S, R-Cont., Long e + 2 Vowel | Pattern S, R-Cont., Long e, 2 Vowel, Dipthong + Special |
|---|---|
| 1. slaid | 1. spaul |
| 2. brame | 2. blair |
| 3. brab | 3. trab |
| 4. splart | 4. spait |
| 5. shay | 5. spraw |
| 6. trame | 6. slape |
| 7. sparl | 7. traik |
| 8. snarb | 8. snaig |
| 9. trach | 9. traip |
| 10. blay | 10. palir |
| 11. craith | 11. smass |
| 12. sharm | 12. spalim |
| 13. tais | 13. flass |
| 14. stabe | 14. brab |
| 15. braig | 15. snarg |
| 16. snale | 16. slail |
| 17. brait | 17. crale |
| 18. scrail | 18. frait |
| 19. smag | 19. snarg |
| 20. snass | 20. splaib |

FIG. 3

```
                    DICTATION-SPELLING
                        a SOUNDS

1.   He will play in the ball game.  If he bats the  ball
and  it trays,  I will trap it with my hand.  Then I will
race to save a run from the other team.

2.  We will rake the yard and clear it of trash.  There is
glass  in the grass in the patch behind the tree.  If  we
see a snake, our raking may end.

3.   There  was  a crash in the  grand  stands.   A tramp
dropped a sack of black plates.  The plates landed on part
of the hard floor.  They scared the man.

4.  We will mark the part of the class that will take part
in the play.  The cast will act out their parts on a farm.
Pam and Mack will star in the play.

5.  The lamp and the  plates are in the van.  We will wrap
the  glass  in the mat  before packing it in the  van.   A
crash would smash all of these things.

6.   We  are going to see the best band in the  land.   We
will chat with our friends,  clap our hands,  and pat  our
feet  when the band plays.  We will have a grand time  in
the stands.

7.  There was a splash like a flash in the lake.  The big
bass slapped its tail on the water.  I want to catch that
bass with my fishing pole and land it with my net.

8.   The tramp snatched a batch of candy from the plate on
the  glass  table.  He crammed the candy in his  bag  and
dashed off in a mad race.

9.   Kay and Fran will take a plate of cake.  We will make
a stack of cookies.  Dan will bring some snacks, and Dave
will bring candy.

10.   We skated and swam Sunday.  I was the champ in both
races.   I passed Sam to win both races.  After that,  he
was a brat.
```

FIG. 8

FIG. 9
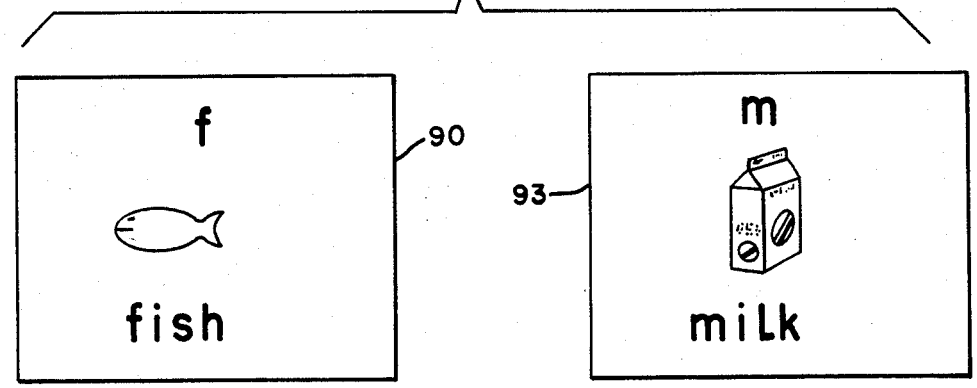
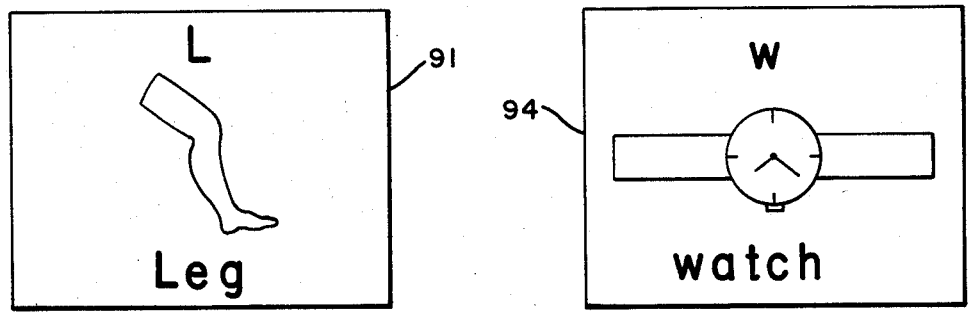
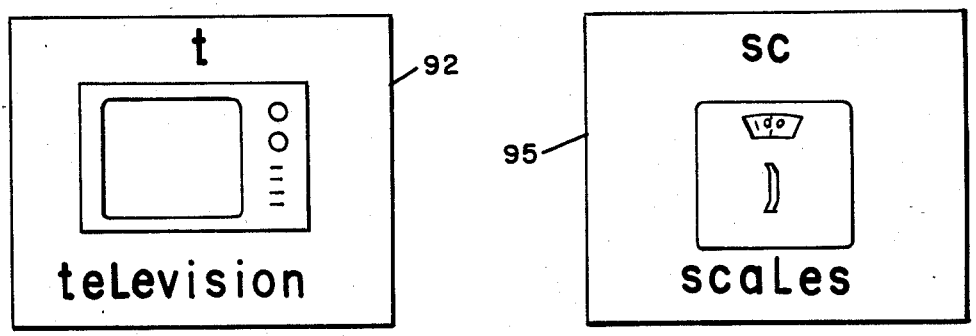

APPARATUS FOR AND METHOD OF TEACHING READING AND SPELLING

TECHNICAL FIELD

The present invention relates generally to teaching reading and spelling. Specifically, this invention relates to a multisensory system of phonogram analysis, classification and blending.

BACKGROUND ART

Systems for the teaching of reading and spelling are well known in the art. The Fernald Method is discussed in Grace Fernald's *Remedial Techniques in Basic School Subjects* published in 1943 by McGraw-Hill. The Gillingham Method is discussed in *Remedial Training* by Anna Gillingham and Bessie W. Stillman, published by Educators Publishing Service in 1960. The Palo Alto Series is discussed by Theodore E. Glim in *The Palo Alto Reading Program* published in 1968 by Harcourt, Brace and World, Inc.

People who are learning to read often have difficulty in pronouncing words. Frequently, they also have difficulty with developmental disabilities in auditory memory, auditory blending and visual memory. Those with severe problems in these areas are many times diagnosed as auditory or visual dyslexics.

The present system is a multisensory approach for the teaching of reading and spelling. This system uses phonogram analysis and classification, and then blends these with consonant/consonant blends. The system is in contrast to the two best known methods, the Fernald Method and the Gillingham Method, which are used primarily with learning disabled children. The Fernald Method uses a whole word approach (analyzing each letter), and the Gillingham Method uses a sound blending approach of each phonemic sound. Both the Fernald Method and the Gillingham Method use the multiple sounds of phonics, while the present system groups the sounds into classified larger segments, thus reducing the amount of blending and synthesis combinations needed. The word patch for example, is sounded in four steps in the prior art (p-a-t-ch), while the present system uses only two steps (p-atch).

DISCLOSURE OF INVENTION

Children with developmental disabilities in visual and auditory memory or auditory blending benefit greatly from the present system. Children with auditory memory problems, for example, cannot retain in memory the multiple sounds of phonics (Ex: p a t ch-four elements.) Those with sound blending disabilities can remember the sounds but cannot blend the sounds together into knwon words. The present system reduces the number of sounds and blends that are synthesized, thereby substantially reducing these blending problems. Children with visual memory problems cannot retain the configuration of a word in memory. This system builds skills in their stronger modality, the auditory. The present system helps strengthen visual memory by repetition of words with the basic phonogram (Ex: ap at ent ip op ut) and consonant/consonant blend patterns. In many traditional basal reading book series which use phonics, each word seems like a new word to the child with visual memory problems. The present system helps such children see the basic patterns of sounds. Other basal series such as the Palo Alto Series, use phonogram patterns in sentences (Ex: Nan can fan the tan man.) According to John T. Guthrie, Editor of William S. Gray's *Reading: A Research Prospective*, 1881-1941 published in 1984 by International Reading Association, Inc., word identification increases in such series, but comprehension does not increase as much because of the meaningless content.

The present system is the first that has been devised for use in any basal series, thus giving the increase in word identification while allowing comprehension increases through meaningful content. This method can also be used with books such as Lewis Carroll's *Alice in Wonderland*.

In addition, the present system is a rapid method for teaching decoding skills to children and adults without developmental disabilities. This system can reinforce all the sounds in the language in as few as five one-hour sessions.

Thus a major object of the present invention is to provide a systematic approach for teaching auditory dyslexics (with auditory memory and auditory blending problems) and visual dyslexics (with visual memory problems) through the use of phonograms.

Another object of this invention is to provide such an approach which can be used with any basal series or with any trade book.

Yet another object of this invention is to provide a rapid decoding system for children and adults without developmental disabilities.

Another object is to provide a classification board, whereupon a person must cognitively make a decision and then tangibly place phonogram cards depicting the classification of vowel sounds within each vowel group, which leads to rapid understanding of language patterns and thus to rapid decoding skills.

Another object of this invention is to provide a systematic way of teaching spelling to dyslexics and normals through the use of phonograms, words lists for dictation, worksheets, and directions to the clinician.

Still another object of this invention is to provide a Bike-a-Phon teaching game for the reinforcement of phonogram sounds.

Yet another object of the present invention is to provide a teaching system comprising: (a) five sets of phonogram cards (a, e, i, o, u) depicting all the major vowel sounds of the language; (b) a classification board whereby a person can classify all the vowel sounds into seven categories and thus give tangibility to a maze of sounds; (c) a game whereby the phonogram sounds can be reinforced; (d) a set of directions, word lists, and worksheets for teaching decoding/spelling by use of phonograms; and (e) a set of consonant/consonant blend cards consisting of pictures to cue the sounds.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with accompanying drawings in which like parts are given like identification numerals and wherein:

FIG. 2 is a plan view of a dictation-rehearsal list of the present invention.

FIG. 3 is a plan view of a phonetic word list of the present invention.

FIG. 8 is a plan view of a sentence dictation sheet.

FIG. 9 is a plan view of picture cards for additional reinforcement.

BEST MODE FOR CARRYING OUT THE INVENTION

Phonic sounds have typically been classified by rules that are depicted in the following catagories: r-controlled, short, two vowels together, last e, open syllable, and dipthongs. According to the present invention, phonograms are classified by these patterns and then a special catagory for the irregular phonograms of each vowel is designated the special catagory. The sounds are clssified by tangible cards on a gameboard. This simple technique forces a child to make a cognitive decision and overtly place the sound into a classification scheme. This is particularly effective with children who have auditory and visual memory problems. These sounds were formerly meaningless and endless to these disabled children, but the classification board tangibly illustrates how the sounds fit into a pattern. This system also allows children and adults without disabilities to rapidly understand patterns of the language.

Using the present system, auditory dyslexics are trained to look at the patterns, the number of vowels, and the placement of vowels in the phonogram patterns. From this, phonic rules, which were formerly meaningless, begin to make sense. The phonic rules are:

1. If there is one vowel in a word or syllable and the vowel does not end the syllable, the vowel is short. (Example: ap, at, am, an)
2. If an r follows the vowel, the vowel is r-controlled (Example: ar, or, er, ir, ur)
3. If there are two vowels in a one syllable word (or the last syllable of a polysyllabic word) and the second vowel is a final e, the e is slient and the preceding vowel is long. (Example: cute, bride)
4. If there are two vowels together, the first one says the long sound and the second vowel is silent. (Example: aid, aim, oak)
5. If there are two vowels together that blend to make a new sound, the vowel blend is a diphthong. (Example: au, aw, ew, oy, oi, ow, ou)
6. If there is one vowell in a word or syllable, and it ends the syllable, the vowel is long. This CV pattern is called an open syllable. (Example: hi, me, go.)

The present method classifies the vowel sounds of phonogram patterns into seven groups: short, r-controlled, last e, two vowel, dipthongs, open syllable, and special sounds. This method requires that the child use the thinking skills of observation, analysis, comparison, and classification with the sounds of the language. By definition, observation is finding out all one can about something by looking, listening, and using the senses. Analysis means looking at the unique features of a word or phonogram. Comparison means determining how a word or phonogram is alike or different from the classification scheme. Classification means putting words or phonograms which are alike into groups under the designation of that group in the classification scheme. The present system has the unique feature of requiring that a child pickup tangible cards with the basic phonograms thereon and place them overtly into a classification scheme.

Figure 1:
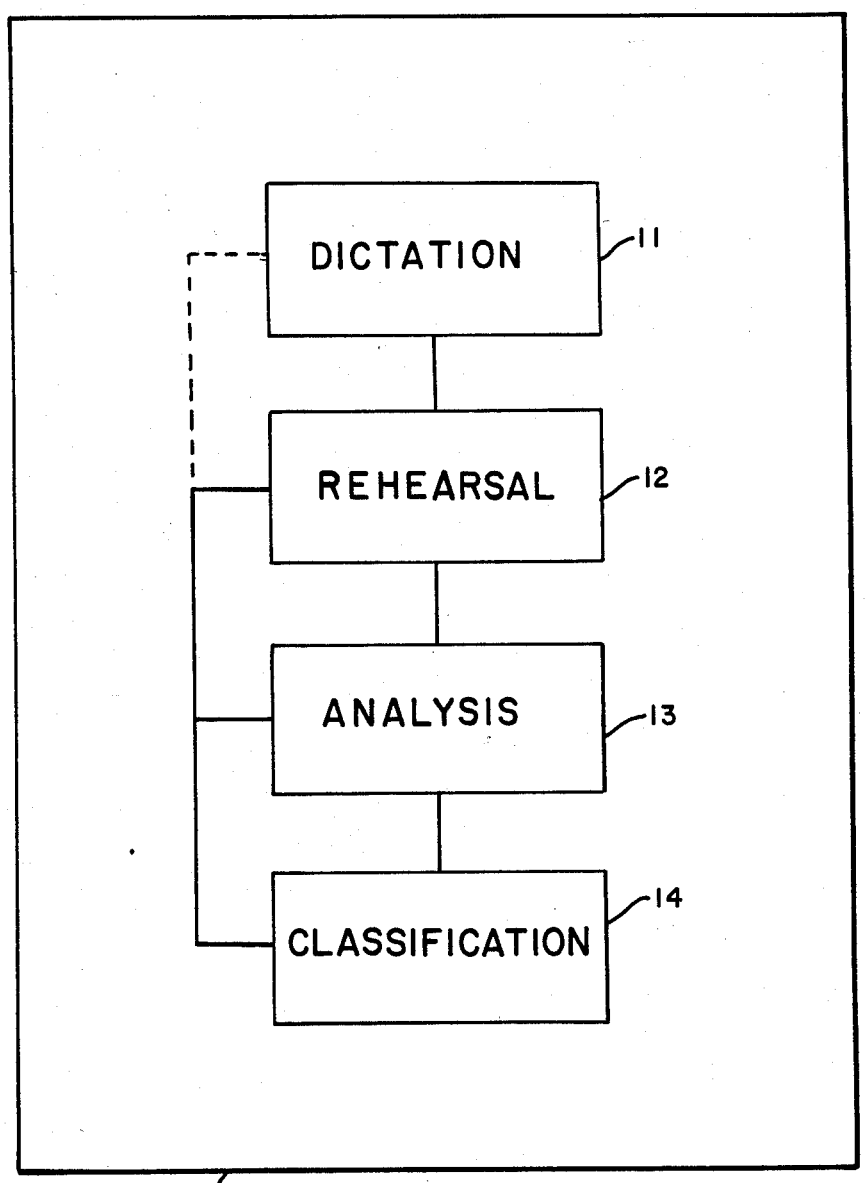
FIG. 1 is a flow chart of the teaching system according to the present invention.

FIG. 1 is a flow chart 10 of the present system. The first step is dictation 11, the second is rehersal 12, the third is analysis 13 and the fourth is classification 14. The initial task is the decoding of one syllable words. All phonograms associated with each vowel are taught to the child in the conventional manner described below. Children with average intelligence and without developmental disabilities can usually cover one entire group of vowel sounds in one session, while children with low intelligence, with attention deficits or with auditory or visual disabilities may require more sessions on each vowel.

Dictation begins with a dictation-rehearsal list 20 shown in FIG. 2. While FIG. 2 shows only the r-controlled and last e sounds, similar lists are used with each of the other vowel sounds. Using the r-controlled sound list, the instructor dictates approximately four words under each phonogram group, and the child writes them in the following manner:

| ar | art | ark | arm | arn |
|---|---|---|---|---|
| bar | cart | bark | farm | barn |
| car | dart | dark | harm | darn |
| tar | mart | Mark | | tarn |
| far | part | lark | | |

The ar phonogram group should be completed before starting the art group, and each group is similarly completed before moving to the next.

In the rehearsal step, the instructor rehearses phonograms not known by the child for about ten minutes per day. For example, the teacher says the ar phonogram and child says with the teacher bar, car, tar, far. This rehearsal drill helps children with auditory blending, rhyming, and auditory discrimination skills. When the child becomes adept at a certain phonogram, the phonogram is no longer rehearsed. As FIG. 1 illustrates, new phonograms are rehearsed until mastery in the classification stage is achieved.

In the third step, analysis of words occurs when the child looks at a word, compares it with the dictation list and then underlines the phonogram within the word starting with the vowel and going to the end of the one syllable word in the following manner.

Example: dark

The child then says the phonogram ark and then the word dark.

Analysis of lists of phonetic words as well as nonsense phonetic words are used. FIG. 3 illustrates a sheet 30 of such word lists. In addition, phonetic words that the child misses from the basal series are used for analysis. This can be done in two ways. First, the teacher underlines the phonogram and then directs the child to say the phonogram and then say the word. Second, the child underlines the phonogram, says it, and then says the word. Analysis can be repeated as needed as shown by the FIG. 1 flow chart.

Figure 4:
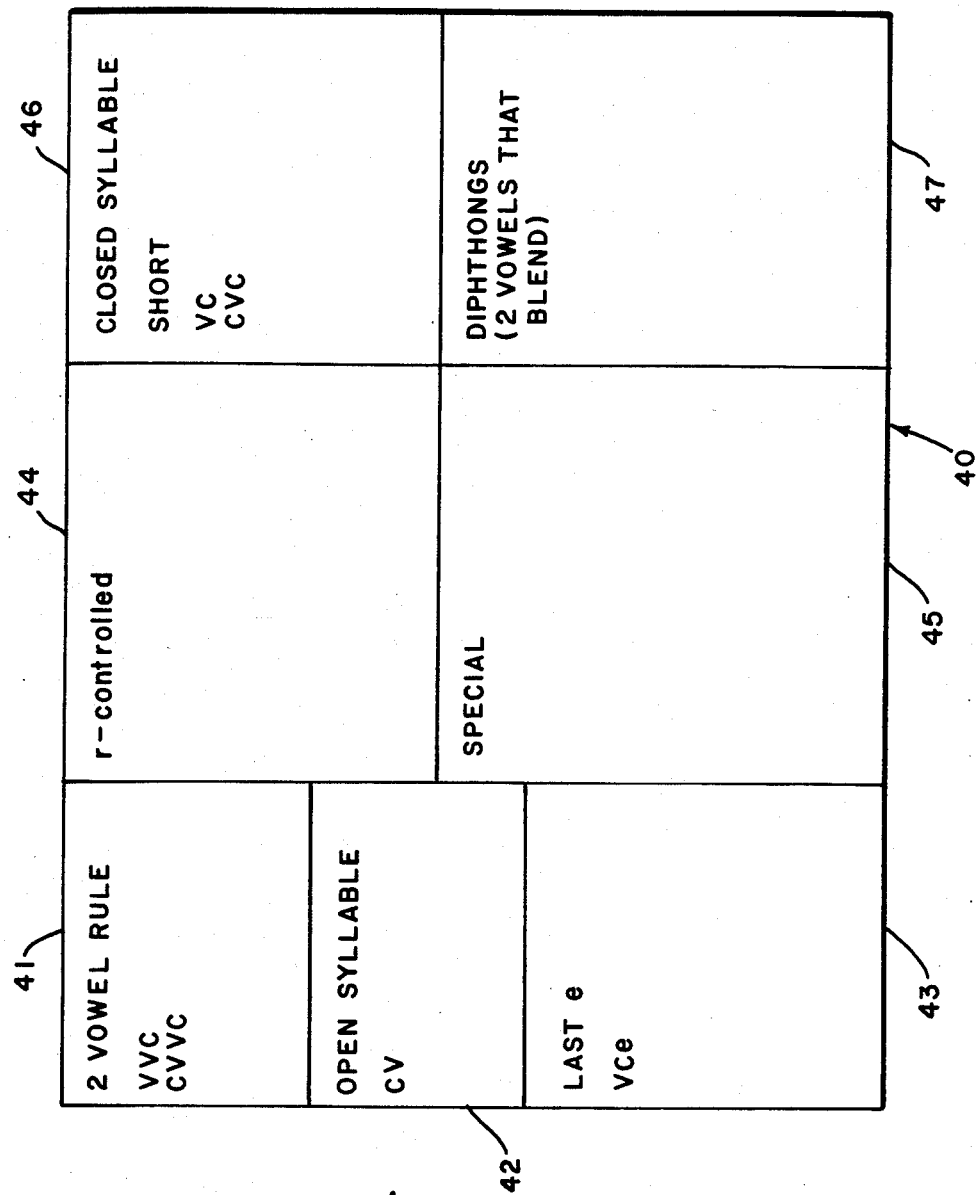
FIG. 4 is a plan view of the classification board of this invention.

Referring now to FIG. 4, the classification board is illustrated generally at 40. Each classification means is identified as follows: two vowel 41; open syllable 42; last e 43; r-controlled 44; special 45; closed syllable 46; and dipthongs 47. The classification board 40 adopts the standard phonic rule classes referred to above and adds the new classifications: special 45 and open syllable 42. The special class 45 encompass basic phonograms which do not fit in one of the six regular patterns.

Figure 5:
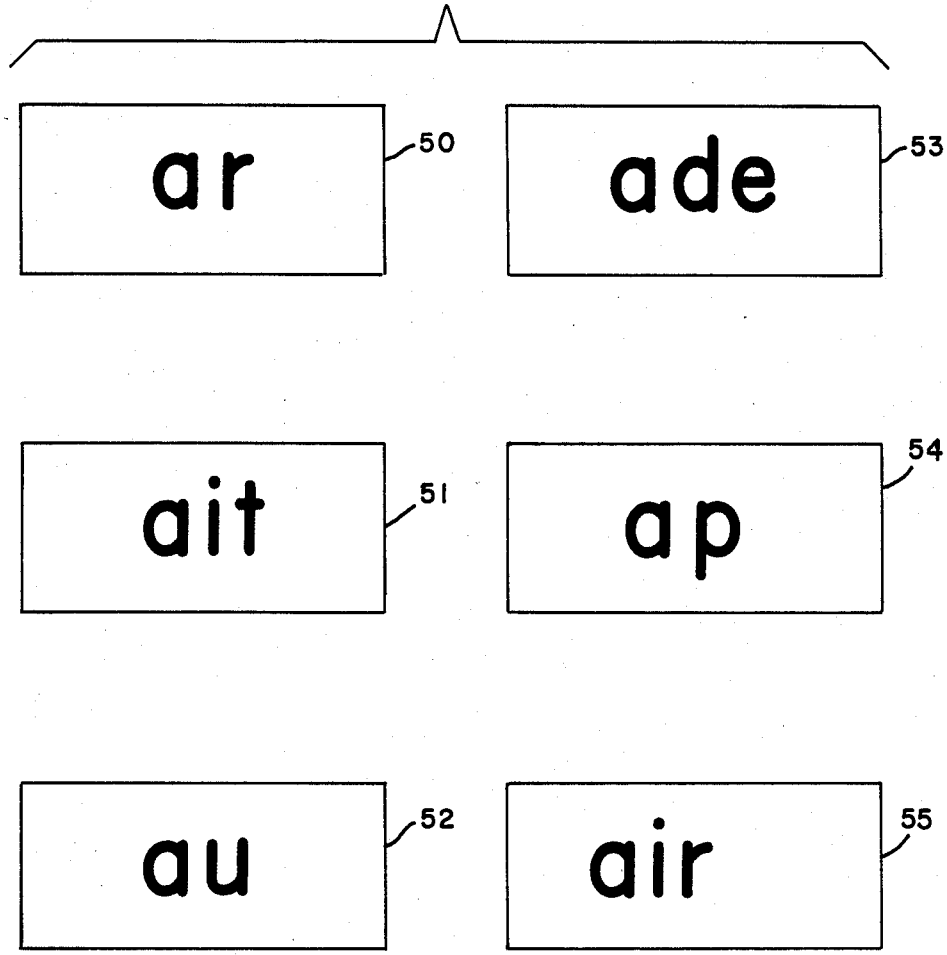
FIG. 5 is a plan view of phonogram cards.

FIG. 5 illustrates a plurality of phonogram cards 50, 51, 52, 53, 54, 55 which are used with the classification board 40. Many other phonogram cards are also used.

In the classification step, the child draws phonogram cards 50-55 from a deck containing all the combinations of the seven classifications of a particular vowel and places them onto a game board divided into the seven classifications. As the child places the cards, the child also says the phonogram. These overt activities denote the degree of mastery of the basic sound-symbol relationships of the language.

Figure 6:
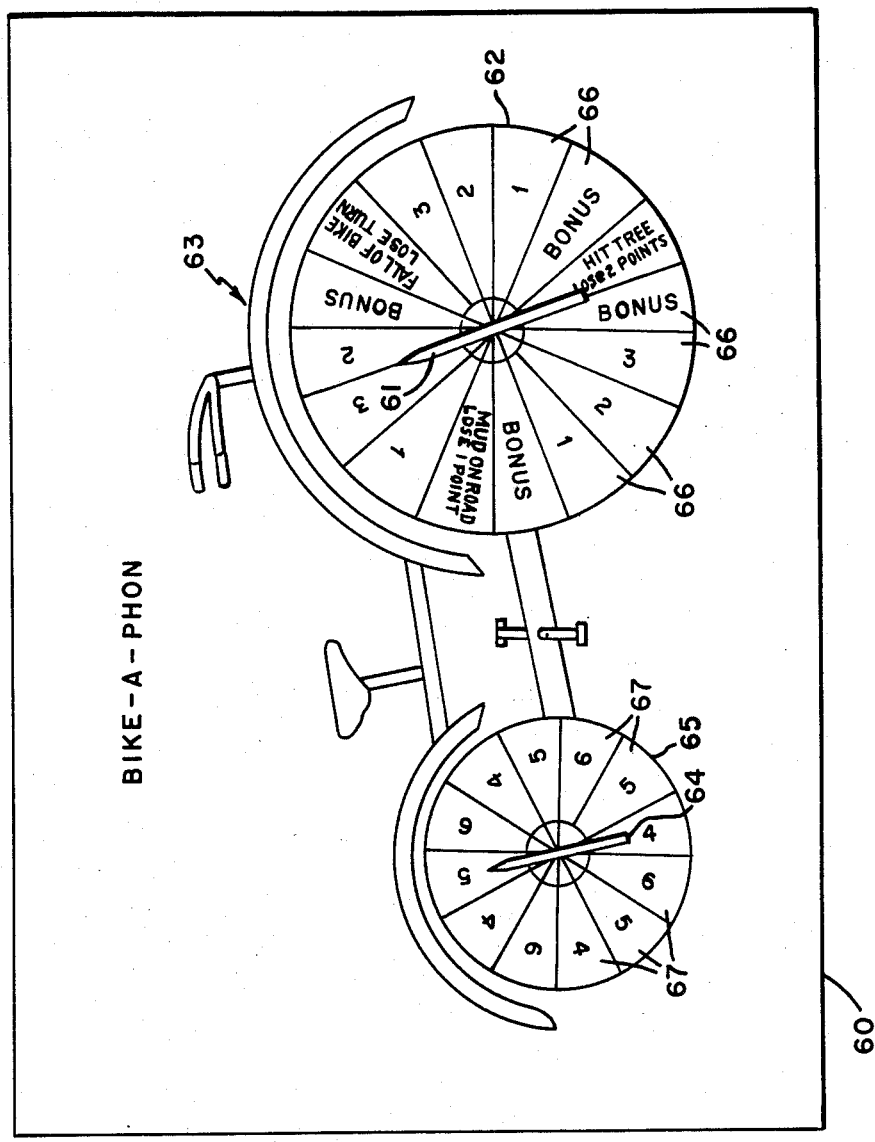
FIG. 6 is a plan view of the Bike-a-Phon game board.
Figure 7:
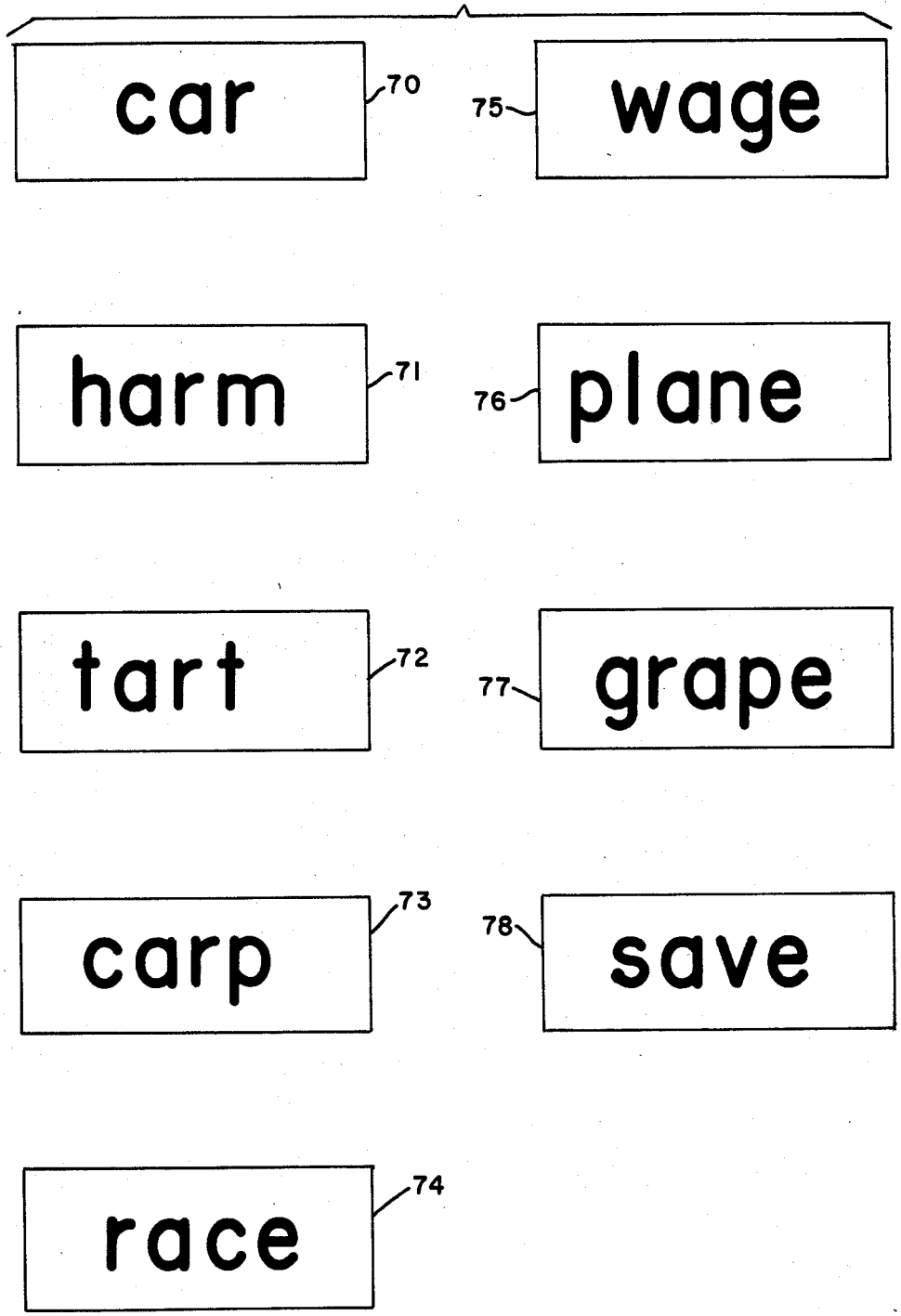
FIG. 7 is a plan view of word cards of the present invention.

A second game board 60 is shown in FIG. 6. This Bike-a-Phon game board 60 comprises a first spinner-/indicator 61 located at the front wheel 62 of an illustrated bicycle 63 and a second spinner/indicator 64 located at the rear wheel 65 of the bicycle 63. A multiplicity of word cards 70-78 of FIG. 7 containing words from the dictation-rehearsal lists (FIG. 2) and words from the basal series studies are places on the pie shaped sections 66 of the front wheel 62 which contain numbers. Phonogram cards 50-55 etc. are placed on the pie shaped sections 67 of the rear wheel 65. Each participant in turn spins the first spinner 61. If the spinner 61 lands on a numbered section 66, the child says the word indicated on the word card 70-78 located there. If the child says the word correctly, the child scores a number of points equal to the number designated on the section 66. If the child does not pronounce the word correctly, the teacher says the word correctly and deducts the designated number of points from the child's score. If the spinner 61 points to a penalty section 66, the penalty indicated is assessed. If the spinner 61 points to a Bonus section 66, the child spins the second spinner 64 of the rear wheel 65. When the second spinner 64 lands on a section 67 the child says the phonogram indicated on the phonogram card 50-55 located in that section 67. If the child says the phonogram correctly, the number indicated on the section 67 is added to the child's score. If the child says the phonogram incorrectly, the teacher says the phonogram correctly but no points are added to or subtracted from the child's score. The first child to accumulate 50 points wins the Bike-a-Phon game. By this competitive process, the known phonograms and words are reinforced and additional words and phonograms are learned.

When the receptive process of reading phonograms is mastered, the student is introduced to the expressive process of spelling phonograms, one syllable real and nonsense words, and sentences by vowel groups in the manner described in more detail below.

After the child masters the classification of one of the vowel sets of phonograms, for example the a vowel, the teacher dictates the phonograms from a dictation-rehearsal list of FIG. 2 to the child and has the child spell them. Relative mastery of one vowel sound is achieved before continuing to another.

When the individual phonograms are mastered, the teacher dictates words with single consonant beginnings, for example dark, bark. As the child gains proficiency at this level, consonant blends such as stark and shark are added. If the child does not know all the consonants/consonant blends, the child is taught these sounds through referral to picture cards of FIG. 9. (Example: sc as in scale.) Then, a list of words using that sound will be used by the teacher. (Example: scab, scale, etc.) The teacher will verbalize these words, with the child repeating the words after the teacher.

The Pattern S Rule states that all short vowel classifications which end in one consonant, double the consonant when adding a suffix beginning with a vowel, for example: ap, at, ag, am. To master the Pattern S phonograms, the teacher dictates about four words under each phonogram as follows:

| ap | at | ag | am |
|---|---|---|---|
| tapping | batting | bagging | slamming |
| napping | patting | lagging | cramming |
| mapping | matting | nagging | damning |
| rapping | ratting | sagging | ramming |

The Pattern S plus two consonants Rule states that all short vowel classifications which end in two consonants add the vowel suffix without doubling the last consonant. To master these phonograms the teacher dictates about four words under each phonogram as follows:

| ast | ack | ash |
|---|---|---|
| fasting | backing | cashing |
| lasting | sacking | smashing |
| blasting | snacking | bashing |
| casting | tracking | slashing |

The Last e Rule states that all one syllable words ending in last e, drop the e when adding a suffix beginning with a vowel. To master the Last e Rule the teacher dictates about four words to the child under each phonogram in the last e classification, for example:

| ate | aze | ame |
|---|---|---|
| dating | blazing | taming |
| mating | hazing | blaming |
| rating | fazing | shaming |
| hating | razing | framing |

From the more complex words, instruction progresses to sentences which are dictated by the teacher from a sentence dictation sheet 80 as shown in FIG. 8. Sentence dictation exercises complete one vowel sound set before beginning another set. When a child makes a mistake, the teacher explains the relationship between the phonograms they read and the phonograms they write.

FIG. 9 illustrates picture cards 90, 91, 92, 93, 94 and 95 for reinforcement of consonant sounds, consonant blend sounds and consonant diagraph sounds as discussed aboved.

While this invention has been described in detail with particular references to a preferred embodiment thereof, it will be understood that variations and modifications can be effective within the spirit and scope of the invention described hereinbefore and as defined in the appended claims.

INDUSTRIAL APPLICABILITY

This invention is capable of exploitation in the education and recreation industries and is particularly useful in a system for the teaching of reading and spelling.

I claim:

1. An instructional system for teaching reading and spelling comprising:

one or more sheets of reading material bearing one or more word groups from one or more phonogram groups further comprising: two vowel phonograms, open syllable phonograms, last e phonograms, r-controlled phonograms, special phonograms, closed syllable phonograms, and diphthongs;

classification means for classifying words into one of said seven phonogram groups, said classification means further comprising a classification board having at least one section corresponding to each of said phonogram groups; and a reinforcement game further comprising: a game board having a first spinner means and a second spinner means; word cards, each card bearing a word having a phonogram from one of said phonogram groups; and phonogram cards, each card bearing a phonogram from one of said phonogram groups.

2. The instructional system of claim 1 wherein said game board has a bicycle thereon with a front wheel encircling said first spinner and a rear wheel encircling said second spinner.

3. The instructional system of claim 2 wherein said front wheel comprises a multiplicity of sections and said rear wheel comprises a multiplicity of sections; further provided that each spinner points to a cooperating section when spun, thereby advancing play of the game.

4. The instructional system of claim 3 comprising a multiplicity of reinforcement picture cards having a word containing a phonogram selected from one of said phonogram groups and a picture associated with said word.

5. The instructional system of claim 1 comprising one or more sheets of reading material bearing one or more groups of sentences having words selected primarily from one or more of said phonogram groups.

* * * * *